April 9, 1968        E. B. PRAY        3,376,895
VALVE
Filed Oct. 21, 1965                            3 Sheets-Sheet 1
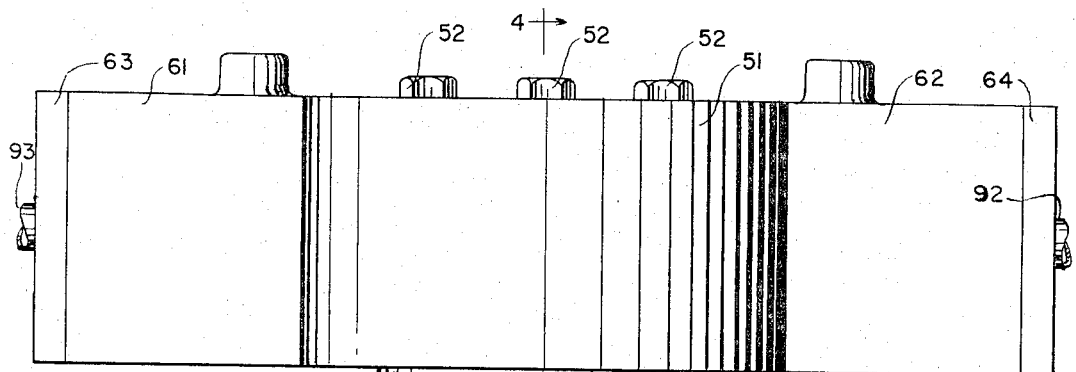
FIG. 1
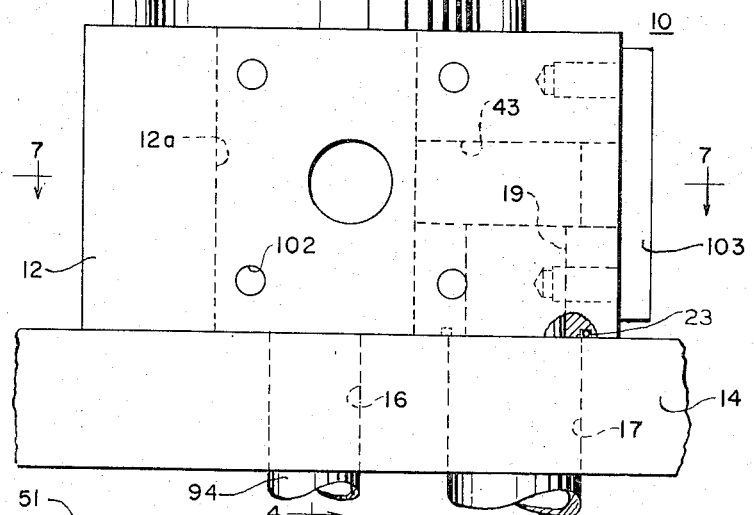
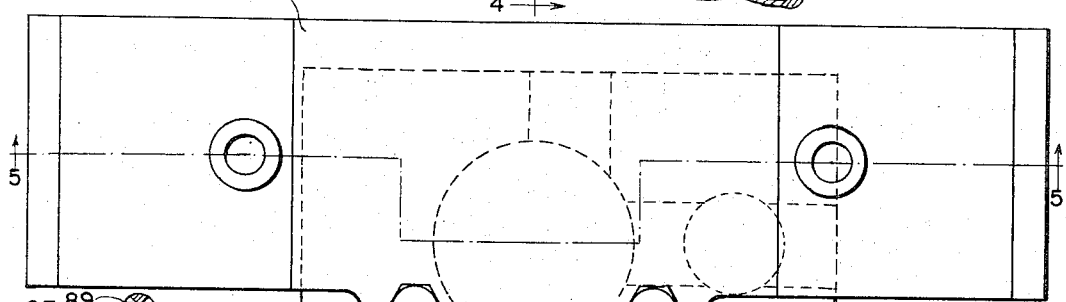
FIG. 2
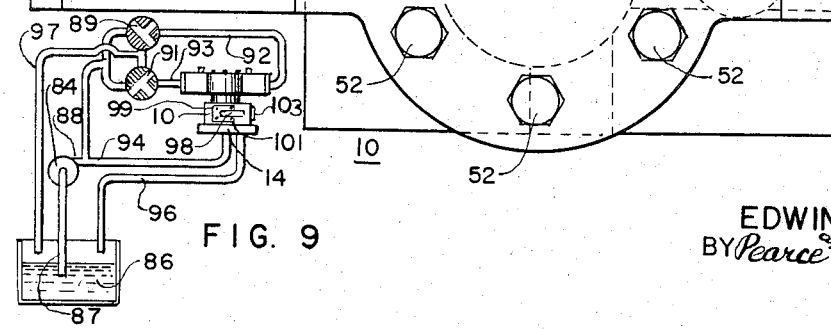
FIG. 9
INVENTOR
EDWIN B. PRAY
BY Pearce & Schaeperklaus
Attorneys

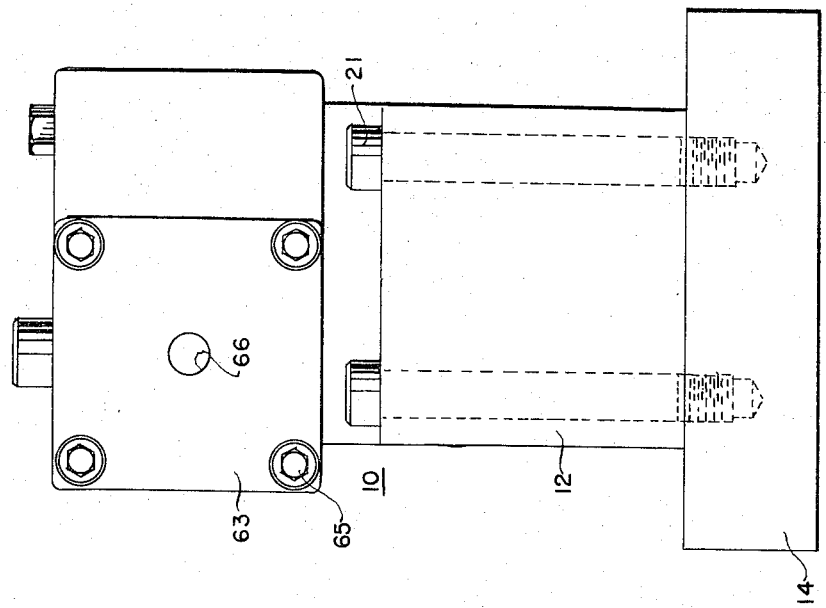
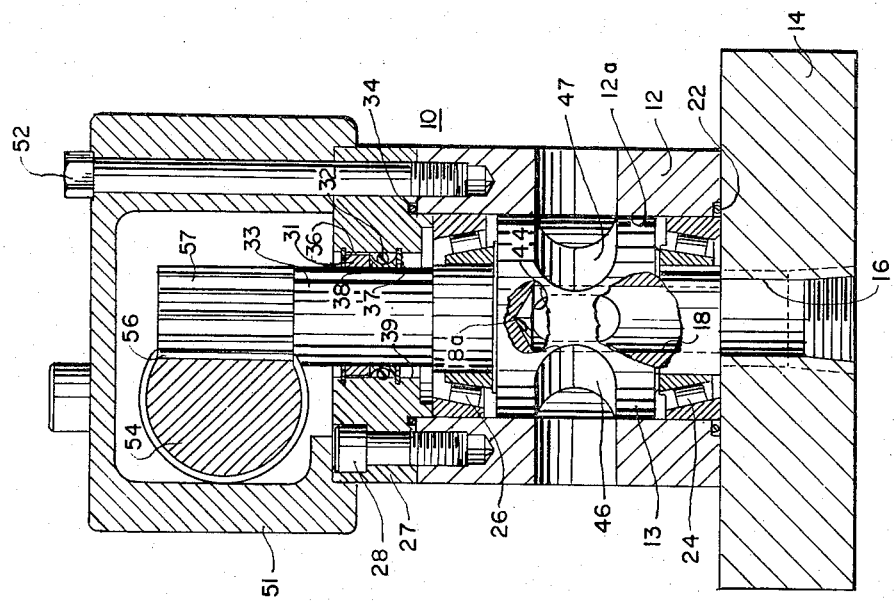

April 9, 1968  E. B. PRAY  3,376,895
VALVE
Filed Oct. 21, 1965  3 Sheets-Sheet 3

INVENTOR.
EDWIN B. PRAY
BY Pearce & Schaeperklaus
Attorneys

United States Patent Office 3,376,895
Patented Apr. 9, 1968

3,376,895
VALVE
Edwin B. Pray, Springfield Township, Hamilton County, Ohio, assignor to Constellation Steel Mill Equipment Corp., a corporation of Ohio
Filed Oct. 21, 1965, Ser. No. 500,136
7 Claims. (Cl. 137—625.66)

This invention relates to a control valve construction. More particularly, this invention relates to such a control valve for hydraulically powered equipment which is of the plug type and has three positions and to an operator for such a valve.

An object of this invention is to provide a valve for controlling flow to hydraulic lines which is constructed to have a continuous flow of hydraulic fluid therethrough not only while mechanisms are driven thereby but also when the mechanisms are at rest.

A further object of this invention is to provide such a valve in which fluid flows continuously through the valve either to mechanisms operated thereby or to a return line which returns the fluid to a fluid supply tank.

A further object of this invention is to provide a control valve of this type having a plug which directs fluid to ports connected to mechanisms and in which fluid under pressure enters the plug along the axis thereof so that the force of the entering fluid on the plug is in an axial direction and does not tend to swing or displace the axis of the plug.

A further object of this invention is to provide a control valve of this type in which fluid flows from the axis from the plug radially and in which the fluid can be directed to outlet ports on opposite sides of the body or to a return line intermediate the outlet ports.

A further object of this invention is to provide a valve of this type in which the radial port in the plug is sufficiently wide that it communicates with one or more of the body ports at all times and in which, as the plug is turned from one position to another, it passes from a position in which the radial port of the plug is in communication with one of the outlet ports through an intermediate position in which the flow is partly to that outlet port and partly to the return line to a position in which all the flow through the discharge line in the plug is to the return line.

A further object of this application is to provide a valve of this type which is hydraulically actuated and in which a hydraulically driven valve operator swings the plug between the various positions.

A further object of this invention is to provide a valve of this type in which the valve operator is advanced to a position in which fluid is delivered to one of the ports when fluid under pressure is introduced through one pilot valve and in which the operator is moved to a position in which the plug directs fluid to the other port when fluid is admitted to the operator through a second pilot valve and in which the operator is moved to an intermediate or neutral point at which the fluid is directed to the return line when pressure is introduced through both of the pilot valves.

The above and other objects and features of the invention will be apparent to those skilled in the art to which this invention pertains from the following detailed description and the drawings, in which:

FIG. 1 is a view in front elevation showing a valve constructed in accordance with an embodiment of this invention, the valve being shown mounted on a fragmentary portion of a support plate;

FIG. 2 is a plan view of the valve illustrated in FIG. 1;

FIG. 3 is a view in end elevation of the valve illustrated in FIGS. 1 and 2, the valve being shown mounted on the support plate;

FIG. 4 is a view in section taken on the line 4—4 in FIG. 1, a portion of a plug being broken away to reveal interior construction;

FIG. 9 is a schematic view showing hydraulic connections associated with the valve.

In the following detailed description, and the drawings, like reference characters indicate like parts.

Figure 5:
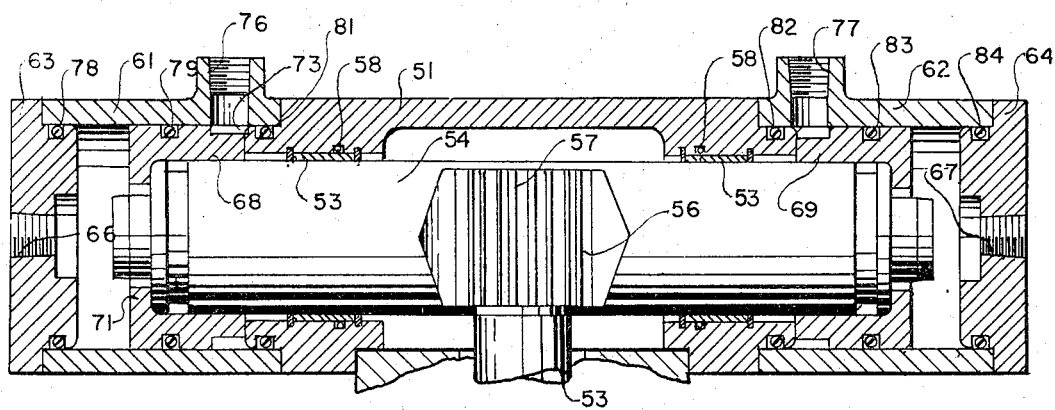
FIG. 5 is a view in section taken on the line 5—5 in FIG. 2 showing a valve operator in centered position.

In FIGS. 1 to 4 inclusive is shown a valve 10 constructed in accordance with an embodiment of this invention. The valve 10 includes a hollow body 12 having a central cavity 12a in which a plug 13 (FIG. 4) is mounted for swinging movement about a vertical axis. The body is mounted on a ported sub-plate 14 having an upright inlet opening 16 and an upright outlet opening 17 (FIG. 1). The inlet opening 16 communicates with the central cavity 12a of the body 12 and with an upright axial channel 18 in the plug 13 (FIG. 4) which terminates at a closed end 18a. The outlet opening 17 communicates with a discharge opening or port 19 (FIGS. 1 and 7) in the body 12.

The body 12 is attached to the sub-plate 14 by bolts 21 (FIG. 3). Appropriate O-ring seals 22 (FIG. 4) and 23 (FIG. 1) surround the central cavity 12 and the discharge opening 19 respectively forming seals between the sub-plate 14 and the body 12. The plug 13 is mounted to swing in high precision tapered roller bearings 24 and 26 (FIG. 4) which are mounted in the cavity 12a of the body 12. The tapered roller bearings maintain the plug precisely in position with minimum clearance between plug walls and body under all pressure conditions. A cap 27 attached to the body 12 by bolts 28 (only one of which is shown, FIG. 4) engages an outer race of the upper bearing 26, and the bearings 24 and 26 and a central portion of the plug 13 are held between the cap 27 and the sub-plate 14. The cap 27 also supports bushing 31 and O-ring seal 32 which forms a seal surrounding an upper portion or stem 33 of the plug 13. A seal between the cap 27 and the body 12 is formed by an O-ring seal 34. Snap rings 36 and 37 hold the bushing 31 and a seal ring retainer 38 in position in a hollow bore 39 in the cap 27.

Figure 7:
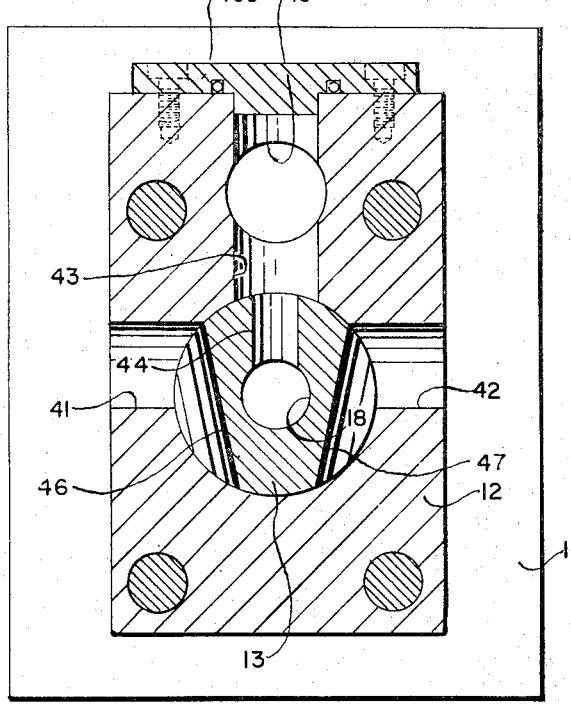
FIG. 7 is a view in section taken on the line 7—7 in FIG. 1.
Figure 8:
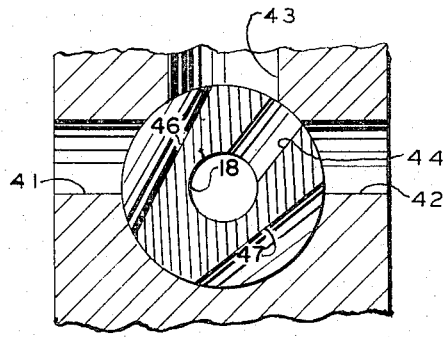
FIG. 8 is a fragmentary view in section taken on the same line as FIG. 7 showing the plug in an intermediate position.

As shown in FIG. 7, the body is provided with aligned discharge ports 41 and 42 on opposite sides thereof and a return port 43 extending at a right angle to the discharge ports 41 and 42 and communicating with the discharge opening 19. The plug 13 is provided with a radial port 44 which receives fluid under pressure from the axial channel 18 and can communicate with the discharge ports 41 and 42 and with the radial return port 43. The plug is also provided with channels 46 and 47 in opposite side walls thereof. As shown most clearly in FIGS. 7 and 8, the plug 13 can be swung to bring the radial port 44 thereof to positions in which it communicates with either of the discharge ports 41 and 42 passing through the position shown in FIG. 7 in which the radial port communicates with the return port 43. The radius of the radial port 44 of the plug is sufficiently great that, while the plug swings between these positions, the radial ports in communication with at least one of the ports in the body at all times and, while the radial port 44 passes from one body port to another, the plug passes through a position, as shown in FIG. 8, in which the radial port is in communication with the return port 43 and the one of the discharge ports. In addition, at all times, when the radial port of the plug is in communication with one of the discharge ports. In addition, at all times, when the radial port of the plug is in communication with one of the discharge ports, the other discharge port is in communication with the return line by way of one of the channels 46 and 47 in the wall of the plug 13.

Details of construction of the mechanism for swinging the plug between its positions are shown in FIGS. 1 to 6 inclusive. As shown most clearly in FIGS. 2 and 4, a hollow housing 51 is mounted on top of the cap 27 and attached to the body 12 by bolts 52. Bushings 53 (FIGS. 5 and 6) mounted inside the housing 51 support a main piston rod 54 for reciprocation inside the housing 51. As shown most clearly in FIG. 4, rack teeth 56 on the main piston rod 54 engage gear teeth 57 on the upper end of the stem 33 of the plug 13 so that, as the main piston rod 54 is moved to the right or left as shown in FIG. 5, the plug 13 is swung thereby. Seals around end portions of the main piston rod 54 are formed by O-ring seals 58 surrounding the bushings 53.

Figure 6:
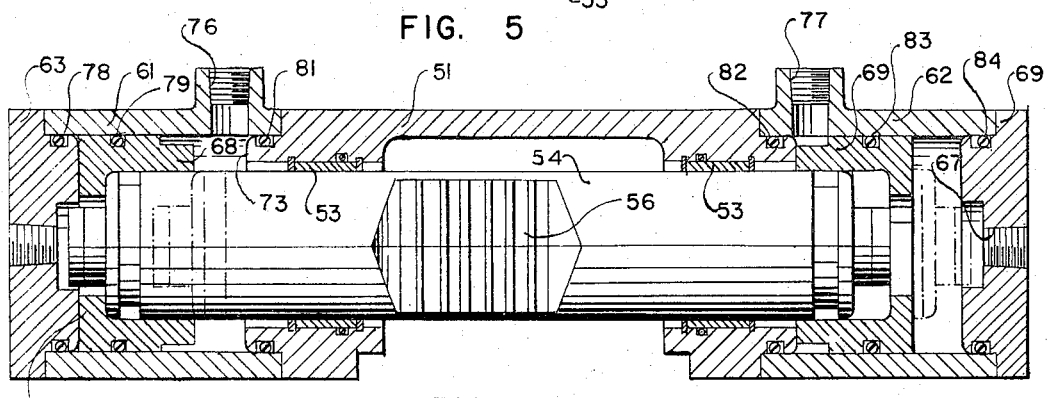
FIG. 6 is a view in section taken on the same line as FIG. 5 but showing a valve operator in one displaced position in full lines and in a second displaced position in dot-dash lines, the plug of the valve being omitted for clarity.

At outer ends of the housing 51 surrounding end portions of the main piston rod 54 are mounted hollow spacer and drain members 61 and 62. End caps 63 and 64 close outer ends of the spacer and drain members 61 and 62, respectively. Bolts 65 (FIG. 3) hold the housing 51, the spacer and drain members 61 and 62 and the end caps 63 and 64 in assembled relation. Central bores 66 and 67 (FIGS. 5 and 6) in the end caps 63 and 64 respectively permit introduction of fluid under pressure thereinside. Floating pistons 68 and 69 reciprocate inside the spacer and drain members 61 and 62, respectively, surrounding end portions of the main piston rod 54. As shown in FIGS. 5 and 6, when pressure is introduced through the bore 66, the floating piston 68 can reciprocate from the position shown in FIG. 6 to that shown in FIG. 5 with a flange 71 of the floating piston 68 in engagement with the main piston rod 54 so that the floating piston and the main piston rod 54 move together. When the floating piston 68 reaches the FIG. 5 position, it is halted by engagement with the end flange 73 of the housing 51. However, the main piston rod 54 can continue to the right to the position shown in FIG. 6 in dot-dash lines. However, if pressure is introduced through the bore 67, as well as through the bore 66, the main piston rod 54 moves to and remains at the centered position shown at FIG. 5. If, on the other hand, pressure is introduced only through the bore 67, the main piston rod moves to the left to the full line position of FIG. 6. Relief openings 76 and 77 are formed in the spacer and drain members 61 and 62 respectively to relieve pressure inside the spacer and drain members. Appropriate O-ring seals 78, 79, 81, 82, 83, and 84 are provided inside the spacer and drain members 61 and 62. The relief openings can be connected to an appropriate receptacle or sump, not shown, to catch fluid which may pass the seals.

Operation of the valve can be understood by reference to FIG. 9. Fluid under pressure is supplied by a pump 84 which draws a fluid from a sump 86 through a dip tube 87. The fluid is discharged by the pump through a line 88 from which the fluid is directed through pilot valves 89 and 91 to lines 92 and 93 respectively and through a line 94 to be delivered upwardly through the inlet opening 16 of the sub-plate 14. Fluid is returned to the sump 86 from the outlet opening 17 through a line 96 and from the pilot valves 89 and 91 through a return line 97. When both of the pilot valves 89 and 91 are positioned to introduce fluid into and through the bores in both end caps the main piston rod (FIG. 5) is moved to its central position at which the radial port 44 of the plug 13 is in communication with one of the discharge ports. When each pilot valve is not in position to introduce fluid into one end cap, the pilot valve can be positioned to permit return passage of fluid to the return line 97.

As the main piston rod 54 moves to the left or right as shown in FIG. 5, the plug 13 is swung. Only a small amount of fluid is required to move the main piston rod, and the interruption of flow of fluid through the pilot valves is not sufficient to cause any abrupt change in fluid flow or hammering in hydraulic lines. On the other hand, although there can be a substantial flow of fluid through the plug 13, as the plug swings, there is continual flow therethrough because the radial port of the plug is always in communication with at least one of the ports 41, 42, and 43 (FIG. 7) in the body, and, so long as the radial port 44 in the plug 13 is in communication with one of the discharge ports 41 and 42, one of the channels 46 and 47 provides return flow of fluid from the other discharge port. Thus, there is no abrupt stoppage of fluid flow through the plug and no "hammering" in hydraulic lines.

The discharge ports can be connected to equipment (not shown) to be operated by hydraulic fluid from the valve through lines 98, only one of which is shown in FIG. 9. The line 98 is mounted on a plate 99. The plate 99 is attached to the body 12 by bolts 101, which are received in threaded sockets 102 (FIG. 1) in the body. A cap plate 103 closes the open end of the return port 43 as shown in FIG. 7.

The valve construction illustrated in the drawing and described above is subject to structural modification without departing from the spirit and scope of the appended claims.

Having described my invention what I claim as new and desire to secure by Letters Patent is:

1. A control valve which comprises a hollow body, a plug mounted in said body for swinging movement thereinside, a sub-plate supporting said valve body, there being an inlet opening in the sub-plate communicating with the interior of the body, there being an axial channel in the plug receiving fluid under pressure from the inlet opening, a cap overlying the valve body, tapered anti-friction bearings supported on the sub-plate and underlying the cap and rotatably supporting the plug, there being a radial port in the plug in communication with the axial channel, there being a pair of discharge ports and a return port in the body, the plug being swingable to bring the radial port into registry with each of the body ports, the radial port being of such width that the radial port communicates with at least one of the body ports at all times, there being channels in the wall of the plug, at least one of the wall channels providing communication between one of the discharge ports and the return port as long as the radial port is in communication with the other discharge port.

2. A control valve which comprises a hollow body, a plug mounted in said body for swinging movement thereinside, there being an axial channel in the plug receiving fluid under pressure, anti-friction bearings rotatably supporting the plug, there being a radial port in the plug in communication with the axial channel, there being a pair of discharge ports and a return port in the body, the plug being swingable to bring the radial port into registry with each of the body ports, the radial port being of such width that the radial port communicates with at least one of the body ports at all times, there being channels in the wall of the plug, at least one of the wall channels providing communication between one of the discharge ports and the return port as long as the radial port is in communication with the other discharge port.

3. A control valve which comprises a hollow body, a plug mounted in said body for swinging movement thereinside, there being an axial channel in the plug receiving fluid under pressure, there being a radial port in the plug in communication with the axial channel, there being a pair of discharge ports and a return port in the body, the plug being swingable to bring the radial port into registry with each of the body ports, there being channels in the wall of the plug, at least one of the wall channels providing communication between one of the discharge ports and the return port when the radial port is in communication with the other discharge port, an elongated piston rod, means for connecting the piston rod to the plug so that the plug swings as the piston rod moves, a pair of cylinders, there being one of said pair of cylinders at each end of the piston rod, a piston in each cylinder, each piston being engageable with the piston rod, means for introducing fluid under pressure into each cylinder to advance the piston therein and the piston rod, and stop means in each cylinder limiting movement of the piston therein, the piston rod being further advanceable by the fluid pressure, the piston rod being advanced to a first position at which the radial port is in communication with the return port when fluid is introduced into both cylinders and to other positions at which the radial port is in communication with one of the discharge ports when fluid is introduced into a single cylinder.

4. A control valve which comprises a hollow body, a plug mounted in said body for swinging movement thereinside, there being an axial channel in the plug receiving fluid under pressure, there being a radial port in the plug in communication with the axial channel, there being a pair of discharge ports and a return port in the body, the plug being swingable to bring the radial port into registry with each of the body ports, the radial port being of such width that the radial port communicates with at least one of the body ports at all times, there being channels in the wall of the plug, at least one of the wall channels providing communication between one of the discharge ports and the return port when the radial port is in communication with the other discharge port, an elongated piston rod, means for connecting the piston rod to the plug so that the plug swings as the piston rod moves, a pair of cylinders, there being one of said pair of cylinders at each end of the piston rod, a piston in each cylinder, each piston being engageable with the piston rod, means for introducing fluid under pressure into each cylinder to advance the piston therein and the piston rod, and stop means in each cylinder limiting movement of the piston therein, the piston rod being further advanceable by the fluid pressure, the piston rod being advanced to a first position at which the radial port is in communication with the return port when fluid is introduced into both cylinders and to other positions at which the radial port is in communication with one of the discharge ports when fluid is introduced into a single cylinder.

5. A valve operator for swinging a plug of a plug-type valve having three operative positions which comprises an elongated piston rod, means for connecting the piston rod to the plug so that the plug swings as the piston rod moves, a pair of cylinders, there being one of said pair of cylinders at each end of the piston rod, a piston in each cylinder, each piston being engageable with the piston rod, means for introducing fluid under pressure into each cylinder to advance the piston therein and the piston rod, and stop means in each cylinder limiting movement of the piston therein, the piston rod being further advanceable by the fluid pressure, the piston rod being advanced to a first position when fluid is introduced into both cylinders and to other positions when fluid is introduced into a single cylinder.

6. A valve operator for swinging a plug of a plug-type valve having three operative positions and having a stem provided with gear teeth which comprises an elongated piston rod, gear teeth on the piston rod in mesh with the gear teeth of the stem of the plug so that the plug swings as the piston rod moves, a pair of cylinders, there being one of said pair of cylinders at each end of the piston rod, a piston in each cylinder, each piston being engageable with the piston rod, means for introducing fluid under pressure into each cylinder to advance the piston therein and the piston rod, and stop means in each cylinder limiting movement of the piston therein, the piston rod being further advanceable by the fluid pressure, the piston rod being advanced to a first position when fluid is introduced into both cylinders and to other positions when fluid is introduced into a single cylinder.

7. A control valve which comprises a hollow body, a plug mounted in said body for swinging movement thereinside, there being an axial channel in the plug receiving fluid under pressure, there being a radial port in the plug in communication with the axial channel, there being a pair of discharge ports and a return port in the body, the plug being swingable to bring the radial port into registry with each of the body ports, the radial port being of such width that the radial port communicates with at least one of the body ports at all times, there being channels in the wall of the plug, at least one of the wall channels providing communication between one of the discharge ports and the return port as long as the radial port is in communication with the other discharge port.

No references cited.

M. CARY NELSON, *Primary Examiner.*

R. J. MILLER, *Assistant Examiner.*